(12) United States Patent
Lin

(10) Patent No.: US 8,143,370 B2
(45) Date of Patent: Mar. 27, 2012

(54) ONE-PART MOISTURE CURABLE SEALANT AND METHOD OF MAKING THE SAME

(75) Inventor: Renhe Lin, Lancaster, CA (US)

(73) Assignee: PRC-DeSoto International, Inc., Sylmar, CA (US)

( * ) Notice: Subject to any disclaimer, the term of this patent is extended or adjusted under 35 U.S.C. 154(b) by 204 days.

(21) Appl. No.: 12/500,145

(22) Filed: Jul. 9, 2009

(65) Prior Publication Data

US 2011/0009557 A1  Jan. 13, 2011

(51) Int. Cl.
*C08G 75/02* (2006.01)
(52) U.S. Cl. ...................................................... 528/376
(58) Field of Classification Search .................... 528/376
See application file for complete search history.

(56) References Cited

U.S. PATENT DOCUMENTS

| | | | |
|---|---|---|---|
| 4,960,844 A | 10/1990 | Singh | |
| 6,509,418 B1 | 1/2003 | Zook et al. | |
| 6,881,462 B2 | 4/2005 | Mullins et al. | |
| 7,097,883 B2 | 8/2006 | Sawant et al. | |

FOREIGN PATENT DOCUMENTS

| | | |
|---|---|---|
| JP | 62-007726 A | 1/1987 |
| JP | 11-322917 A | 11/1999 |
| WO | 2004/108774 A1 | 12/2004 |

OTHER PUBLICATIONS

Database Caplus (online), Chemical Abstracts Service, Columbus, Ohio, US; Oct. 31, 1987; Inoue et al., "Room Temperature-Curable Silyl-containing Polymer Compositions", XP002600349, retrieved from STN Database accession No. 1987:556033, Abstract.

Database Caplus (online), Chemical Abstracts Service, Columbus, Ohio, US; Dec. 17, 2004, Sato et al, "Moisture-Curable Resins, Method for Their Manufacture and Compositions", retrieved from STN Database accession No. 2004:1080944, Abstract.

Matsui, Tatsuro et al., "New Liquid Polysulfide Polymer Terminated with Silyl Group", Journal of Applied Polymer Science, pp. 2642-2649, 2004, vol. 93, Wiley Periodicals, Inc.

Petrie, Edward M., "Moisture Curing Mechanisms for Adhesives and Sealants", SpecialChem Adhesives & Sealants, 2008, SpecialChem S.A.

*Primary Examiner* — Kuo-Liang Peng
(74) *Attorney, Agent, or Firm* — Donald R Palladino

(57) ABSTRACT

One-part moisture curable sealant compositions and methods of making the same are provided. The composition includes a silane-terminated polythioether component and a catalyst. The silane-terminated polythioether component and catalyst are isolated from moisture to prevent curing. The composition is stable against curing at ambient temperature and under conditions substantially free of moisture. When the composition is applied to a substrate and exposed to moisture, the composition cures to form a sealant. A method of making a sealant composition includes reacting a mercapto-terminated polythioether with a compound having a silane group to form a silane-terminated polythioether. The silane-terminated polythioether is then combined with a catalyst and isolated from moisture to prevent curing. Lastly, the composition is applied to a substrate and exposed to moisture which allows the composition to cure to form a sealant.

14 Claims, No Drawings

ONE-PART MOISTURE CURABLE SEALANT AND METHOD OF MAKING THE SAME

FIELD OF THE INVENTION

The invention is directed to sealants for use in aerospace and other applications. More particularly, the invention is directed to one-part, moisture-curable sealants.

BACKGROUND OF THE INVENTION

Sealants useful in aerospace and other applications may be classified into pre-mixed frozen compositions (PMF) and two-part systems. In two-part systems, a first component contains a main polymer, such as a polysulfide polymer, together with a number of additional materials. The first component does not contain a curing agent, which is instead in the second component. The two components are manufactured, packaged separately, and mixed together immediately before use.

Unlike two-component systems which require mixing the curing paste and the base before use, PMFs may be cured by external factors, such as temperature. For this reason, PMFs must be frozen at, for example, −40° F. to −80° F. in order to suppress or slow down the curing reaction. When the PMFs are later brought to room temperature, the curing rate increases significantly. PMFs offer the convenience of being ready for use without mixing, and are therefore more cost- and time-effective than certain two-part systems. However, existing PMFs have limited shelf-lives and require storage at very low temperatures of −40° F. to −80° F. Indeed, existing PMFs require mixing of the base component and activator followed by immediate freezing to slow the curing reaction. Moreover, the PMF must be stored at the freezing temperature prior to use to slow curing. The need for freezing adds considerable manufacturing cost at least in additional labor and equipment. In addition, the composition must be transported and stored at the low freezing temperature (i.e., −40° F. to −80° F.), adding even more cost. Also, as freezing the composition merely slows the curing reaction, the PMF has a limited shelf life.

SUMMARY OF THE INVENTION

According to one embodiment of the present invention, a one-part moisture curable sealant composition includes a silane-terminated polythioether component, a filler, and a catalyst. The silane-terminated polythioether component, filler and catalyst are combined and packaged in a moisture sealed container to substantially prevent curing. The composition is stable under conditions substantially free of moisture, and at ambient temperatures. When the moisture sealed container is unsealed, and the composition exposed to moisture, the moisture promotes curing of the composition to form a sealant.

According to one embodiment of the present invention, a method of preparing a one-part moisture curable sealant composition includes reacting a mercapto-terminated polythioether with a compound having a silane group to form a silane-terminated polythioether. The silane-terminated polythioether is then combined with a filler and a catalyst and isolated from moisture to prevent curing. Lastly, the composition is applied to a substrate, and upon application, the composition is exposed to moisture and allowed to cure to form a sealant.

Embodiments of the present invention have the added benefits that they do not require freezing and storage at low temperatures and that they have an extended shelf life.

DETAILED DESCRIPTION OF THE INVENTION

In one exemplary embodiment of the present invention, a one-part moisture curable sealant composition includes a silane-terminated polythioether component, a filler, and a catalyst. The silane-terminated polythioether component, filler and catalyst are combined and packaged in a moisture sealed container to substantially prevent curing. The composition is stable under conditions substantially free of moisture, and at ambient temperatures. As used herein, "free of moisture" and "substantially free of moisture" means that although the composition may contain some moisture, the amount of moisture is not sufficient to effect substantial curing of the composition. When the moisture sealed container is unsealed and the composition applied to a substrate, the composition exposed to moisture which promotes curing of the composition to form a sealant useful in many applications, including, but not limited to aerospace and similar applications.

The silane-terminated polythioether component may be any silane-terminated polythioether terminated with hydrolyzable groups that are also capable of condensing. The silane-terminated polythioether component may be a single silane-terminated polythioether or a combination of silane-terminated polythioethers. The silane terminal groups include hydrolyzable and condensable groups attached to the Si atom. Non-limiting examples of suitable hydrolyzable groups for attachment to the Si atom of the silane group include alkoxy groups and the like.

According to embodiments of the present invention, silane-terminated polythioethers can be prepared by reacting a mercapto-terminated polythioether with a compound having a silane group. Any suitable mercapto-terminated polythioether may be used. As used herein, "polythioether" refers to a polymer having a backbone including S atoms, but which does not include S—S linkages, i.e., the polymer backbone has —C—S—C— linkages. Non-limiting examples of suitable compounds having silane groups include silane-terminated vinyl compounds, silane-terminated isocyanate compounds, and silane-terminated epoxy compounds.

Useful mercapto-terminated polythioethers can be produced by reacting a divinyl ether or mixtures of divinyl ethers with an excess of dithiol or mixtures of dithiols. In some exemplary embodiments, the mercapto-terminated polythioether used in the reaction to make the silane-terminated polythioether may be a mercapto-terminated polythioether represented by Formula (1), below. Mercapto-terminated polythioethers useful in the formation of the present invention have a terminal mercapto functionality of at least 2.

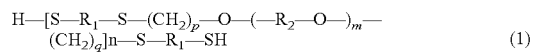

$$H—[S—R_1—S—(CH_2)_p—O—(—R_2—O—)_m—(CH_2)_q]n—S—R_1—SH \quad (1)$$

In Formula 1, $R_1$ may be selected from $C_2$ to $C_{10}$ n-alkylene groups, $C_2$ to $C_6$ branched alkylene groups, $C_6$ to $C_8$ cycloalkylene groups, $C_6$ to $C_{10}$ alkylcyloalkylene groups, heterocyclic groups, $—[(—CH_2)_p—X]_q—(CH_2)_r—$ groups, and $—[(—CH_2)_p—X]_q—(—CH_2)_r—$ groups in which at least one $—CH_2—$ unit is substituted with a methyl group. $R_2$ may be selected from $C_2$ to $C_{10}$ n-alkylene groups, $C_2$ to $C_6$ branched alkylene groups, $C_6$ to $C_8$ cycloalkylene groups, $C_6$ to $C_{14}$ alkylcyloalkylene groups, heterocyclic groups, and $—[(—CH_2)_p—X]_q—(CH_2)_r—$ groups. X may be selected from O atoms, S atoms, and $—NR_3—$ groups. $R_3$ may be selected from H atoms and methyl groups. Also, in Formula 1, m is an integer ranging from 1 to 50, n is an integer ranging from 1 to 60, p is an integer ranging from 2 to 6, q is an integer ranging from 1 to 5, and r is an integer ranging from 2 to 10. In one embodiment, for example, $R_1$ is a $C_2$ to $C_6$ alkyl group and $R_2$ is a $C_2$ to $C_6$ alkyl group.

In an exemplary embodiment, the mercapto-terminated polythioether component may be represented by a mercapto-terminated polythioether of Formula 1, where $R_1$ is $—[(—CH_2)_p—X]_q—(—CH_2)_r—$, p is 2, X is an O atom, q is 2, r is 2, $R_2$ is an ethylene group, m is 2, and n is 9. In an alternate embodiment of the mercapto-terminated polythioether, m is 1, $R_2$ is n-butylene, and $R_1$ is not ethylene or n-propylene. In another embodiment of the mercapto-terminated polythioether, m is 1, p is 2, q is 2, r is 2, $R_2$ is ethylene, and X is not an O atom.

Additional non-limiting examples of suitable mercapto-terminated polythioether compounds include those disclosed in U.S. Pat. No. 6,509,418 to Zook, et al., the entire content of which is incorporated herein by reference.

According to embodiments of the present invention, the mercapto-terminated polythioether is reacted with a compound having a silane group to create a silane-terminated polythioether component. Non-limiting examples of suitable compounds having a silane group include silane-terminated vinyl compounds, silane-terminated isocyanate compounds, and silane-terminated epoxy compounds. The silane group includes hydrolyzable groups attached to the Si atom. In particular, the silane group may be represented by —Si($Y_aA_b$), in which Y is a functional group that is both hydrolyzable and condensable, and each of a and b ranges from 1 to 3, and a+b is 3. Non-limiting examples of suitable hydrolyzable and condensable groups include alkoxy groups and the like.

Non-limiting examples of suitable compounds having silane groups include compounds represented by $ZR_4Si(Y_aA_b)$, in which R can be any suitable organic chain, Z is a terminal functional group capable of reacting with mercaptan, A is a $C_1$ to $C_4$ hydrocarbon group, a and b are each from 1 to 3, and a+b is 3. For example, R may be a $C_1$ to $C_3$ hydrocarbon chain, and Z may be a vinyl group, isocyanate group, epoxy group, or the like. Non-limiting exemplary compounds having silane groups include silane-terminated vinyl compounds, silane-terminated isocyanate compounds, and silane-terminated epoxy compounds. In one embodiment, for example, a silane-terminated vinyl compound is represented by $CH_2=CH—R_4—Si(Y_aA_b)$. In one exemplary embodiment, a silane-terminated isocyanate compound is represented by $NCO—R_4—Si(Y_aA_b)$. In one exemplary embodiment, a silane-terminated epoxy compound is represented by

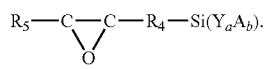

In the compounds having silane groups, Y can be any hydrolyzable group that is also capable of condensing, $R_4$ is as described above, and $R_5$ can be hydrogen or any suitable organic chain. For example, $R_5$ may be any suitable hydrocarbon chain or the like. Non-limiting examples of suitable hydrolyzable groups for Y include alkoxy groups and the like. In some embodiments, for example, smaller alkoxy groups, such as methoxy or ethoxy groups, are used.

In exemplary embodiments of the present invention, a sealant composition comprises a silane-terminated polythioether polymer, a filler and a catalyst. Any suitable catalyst may be used, and a single catalyst or a mixture of catalysts may be used. In one embodiment, for example, the catalyst is a tin catalyst. Non-limiting examples of suitable tin catalysts include organotins, such as dibutyltin bis(acetylacetonate) and dibutyltin dilaurate (available as Metacure T-12 from Air Products and Chemicals, Inc., Allentown, Pa.).

In some embodiments, the silane-terminated polythioether component is present in the sealant composition in an amount ranging from about 30% to 80% by weight. In one embodiment, for example, the silane-terminated polythioether component is present in the composition in an amount ranging from about 55% to 75% by weight. In another embodiment, the silane-terminated polythioether component is present in the composition in an amount of about 66 to 67% by weight.

In some embodiments, the catalyst is present in the composition in an amount ranging from about 0.1% to 5% by weight. In one embodiment, for example, the catalyst is present in the composition in an amount ranging from about 0.1% to 2% by weight. In another embodiment, the catalyst is present in the composition in an amount of about 0.9% by weight.

Non-limiting examples of suitable fillers include carbon black, calcium carbonate, silica, and polymer powders. In some embodiments, the filler is present in the composition in an amount ranging from about 5% to 60% by weight. In another embodiment, the filler is present in the composition in an amount from about 28 to 29% by weight.

In some embodiments, the compositions of the invention include a lightweight filler particles. As used herein, the term "lightweight" when used with reference to such particles means that the particle has a specific gravity of no more than 0.7, in some cases no more than 0.25 or no more than 0.1. Suitable lightweight filler particles often fall within two categories—microspheres and amorphous particles. The specific gravity of the microspheres often ranges from 0.1 to 0.7 and include, for example, polystyrene foam, microspheres of polyacrylates and polyolefins, and silica microspheres having particle sizes ranging from 5 to 100 microns and a specific gravity of 0.25 (ECCOSPHERES®, W. R. Grace & Co.). Other examples include alumina/silica microspheres having particle sizes in the range of 5 to 300 microns and a specific gravity of 0.7 (FILLITE®, Pluess-Stauffer International), aluminum silicate microspheres having a specific gravity of from about 0.45 to about 0.7 (Z-LIGHT®), and calcium carbonate-coated polyvinylidene copolymer microspheres having a specific gravity of 0.13 (DUALITE 6001AE®, Pierce & Stevens Corp.). In some embodiments, the compositions of the present invention include lightweight filler particles comprising an exterior surface coated with a thin coating, such as those described in U.S. patent application Ser. No. 12/190, 826 at [0016]-[0052], the cited portion of which being incorporated herein by reference.

The composition may also include any number of additives as desired. Non-limiting examples of suitable additives include plasticizers, pigments, surfactants, adhesion promoters, thixotropic agents, fire retardants, masking agents, and mixtures thereof. When used, the additives may be present in the composition in an amount ranging from about 0% to 60% by weight. In some exemplary embodiments, the additives are present in the composition in an amount ranging from about 25% to 60% by weight.

In some exemplary embodiments, the composition comprises at least one plasticizer. A non-limiting example of a suitable plasticizer is HB-40 (available from Solutia, Inc., St. Louis, Mo.). HB-40 is a mixture containing hydrogenated terphenyl, partially hydrogenated quaterphenyls and higher polyphenyls, and terphenyl. However, any suitable plasticizer may be used. In some exemplary embodiments, the plasticizer is present in the composition in an amount ranging from about 0.1% to 40% by weight. In an exemplary embodiment, the plasticizer is present in the composition in an amount ranging from about 0.1% to 8% by weight. In another embodiment, the plasticizer is present in the composition in an amount of about 3 to 4% by weight. In embodiments in which a plasticizer is used, the plasticizer and the catalyst may be placed in a solution prior to combining the catalyst with the silane-terminated polythioether.

One advantage of the compositions of the present invention is that a separate curing agent, such as the polyolefins, polyacrylates, metal oxides, and polyepoxides described in U.S. Pat. No. 6,509,418 to Zook, et al. (referenced above) is not necessary in order to provide for a curable composition. As a result, the compositions of the present invention are, in some embodiments, substantially or, in some cases, completely free of any such curing agents. As used herein, the term "substantially free", means a material is present, if at all, as an incidental impurity. In other words, the material does not affect the properties of the composition. As used herein, the term "completely free" means a material is not present in the composition at all.

For storage and transportation, the sealant composition including the silane-terminated polythioether component, filler and catalyst is sealed in a moisture-tight container. While sealed from moisture in the container, the composition is stable and remains substantially uncured.

To use the sealant, the moisture-tight container is opened, the composition is applied to a substrate, and the sealant composition is exposed to moisture. The moisture reacts with the silane-terminated polythioether component, replacing the hydrolyzable and condensable groups on the Si atom with hydroxide groups as shown in the non-stoichiometric reaction of Step 1, below. In the presence of the catalyst and moisture, the composition cures according to the non-stoichiometric reaction of Step 2, below, thereby forming a sealant useful in many applications.

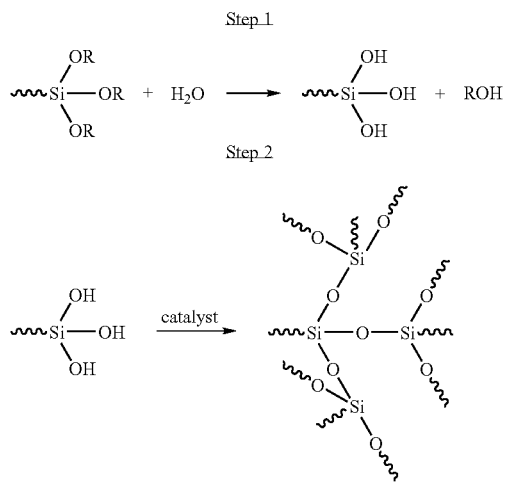

In some embodiments, a method of making a silane-terminated polythioether component comprises reacting a mercapto-terminated polythioether with a compound having a silane group. The mercapto-terminated polythioether and the compound having a silane group are as described above. Upon reaction, the mercapto groups of the mercapto-terminated polythioether react with the terminal functional groups capable of reacting with mercaptan of the compound having a silane group to form a silane-terminated polythioether component represented by $(Y_aA_b)SiR_4Z'$—R'—$Z'R_4Si(Y_aA_b)$. R' is a polythioether chain having at least one —C—S—C— linkage in its backbone and wherein the backbone is free of S—S linkages, Y is a hydrolyzable and condensable functional group, A is selected from the group consisting of $C_1$ to $C_4$ hydrocarbon functional groups, and Z' is a functional group resulting from a reaction between mercaptan and the Z functional group (i.e., a functional group capable of reacting with mercaptan, such as isocyanate groups, epoxy groups and vinyl groups). In one embodiment, for example, the silane-terminated polythioether component is represented by Formula (2), below.

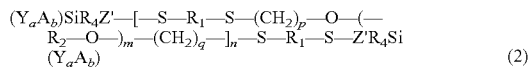

(2)

In Formula 2, Z' is the reaction product of the Z functional group with the mercaptan functional group. For example, when Z is a vinyl group, Z' will be —$CH_2$—$CH_2$—, and the resulting terminal functional group will be —$CH_2$—$CH_2R_4Si(Y_aA_b)$. When Z is an isocyanate group, Z' will be

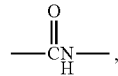

and the resulting terminal functional group will be —CONH—$R_4$—$Si(Y_aA_b)$. When Z is an epoxy group, Z' will be

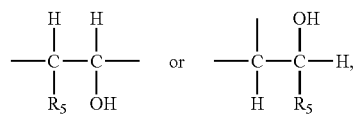

and the resulting terminal functional group will be

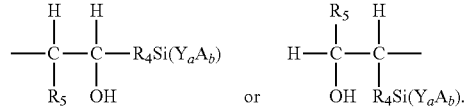

The resulting silane-terminated polythioether component is then combined with a filler and a catalyst in an environment substantially free of moisture to form an uncured sealant mixture. Suitable catalysts are as described above. According to some embodiments, additives are included in the composition. Suitable additives are described above and include plasticizers, pigments, surfactants, adhesion promoters, thixotropic agents, fire retardants, fillers, masking agents, and mixtures thereof. The silane-terminated polythioether, catalyst and optional additives may be included in the composition in amounts as described above.

The composition is isolated from moisture to prevent curing. In some embodiments, the composition is sealed in a substantially moisture-free container. Upon application to a substrate, the composition is exposed to moisture which allows the composition to cure to form a sealant as described above.

The following Examples are presented for illustrative purposes only, and do not limit the scope of the present invention.

EXAMPLES

Example 1

Synthesis of Silane-Terminated Polythioether 707.69 g of Permapol® P-3.1E, (a mercapto-terminated polythioether available from PRC-Desoto, Sylmar, Calif.) was placed into a round bottom flask. The flask contained inlets and outlets for nitrogen gas. The polymer was degassed at about 5 mmHg for 40 minutes. Nitrogen was then introduced. While stirring, 109.88 g of 3-isocyanatopropyltriethoxysilane was added. The mixture was heated at 170-176° F. for 24 hours. At this point, the mercaptan equivalent weight of the mixture was 30,931. An additional 7.0 g of 3-isocyanatopropyltriethoxysilane was added and heating was continued for 15 hours. The mixture was then degassed at 172-174° F. and 10 mmHg to give an amber-colored polymer. At this point, the mercaptan equivalent weight of the mixture was 67,500. Its viscosity was 99P at 3,000 RPMs, as measured by a Brookfield CAP 2000 Viscometer.

Example 2

Synthesis of Silane-Terminated Polythioether 736.69 g of Permapol® P-3.1E was placed into a round bottom flask. The flask contained inlets and outlets for nitrogen gas. The polymer was degassed at 170° F. and about 5 mmHg for 1 hour. Nitrogen was then introduced. While stirring, 70.56 g of vinyltrimethoxysilane was added. Heating was continued for an additional ½ hour. 10.284 g portions of Vazo-67 (2,2'-azobis(2-methylbutyronitrile) (available from E. I. du Pont de Nemours and Company), a free-radical initiator, were added at 2 hour intervals, while the temperature was maintained at 168-172° F. At this point, the mercaptan equivalent weight of the mixture was 25,670. An additional 5.0 g of vinyltrimethoxysilane was added followed by 4.343 g portions of Vazo-67 at intervals of 2 hours. Heating was continued at 168-172° F. for 4 hours. The mixture was then degassed at 172-174° F. and 10 mmHg to give an amber-colored polymer. At this point, the mercaptan equivalent weight of the mixture was 32,644 and its viscosity was 44 P at 3,000 RPMs.

Example 3

Synthesis of Silane-Terminated Polythioether 715.70 g of Permapol® P-3.1E was placed into a round bottom flask. The flask contained inlets and outlets for nitrogen gas. The polymer was degassed at 160-170° F. and about 5 mmHg for ½ hour. Nitrogen was then introduced. While stirring, 88.01 g of vinyltriethoxysilane was added. Heating was continued for an additional 40 minutes. 10.299 g portions of Vazo-67 were added at 2 hour intervals, while the temperature was maintained at 168-172° F. At this point, the mercaptan equivalent weight of the mixture was 24,178. An additional 7.0 g of vinyltriethoxysilane was added followed by 4.335 g portions of Vazo-67 at intervals of 2 hours. Heating was continued at 168-172° F. for 3 hours. The mixture was then degassed at 168-172° F. and 10 mmHg to give an amber-colored polymer. At this point, the mercaptan equivalent weight of the mixture was 40,225, and its viscosity was 34 P at 3,000 RPMs.

Example 4

Sealant Composition

A silane-terminated polythioether compound was manufactured as in Example 1, i.e., the silane groups on the silane-terminated polythioether were —Si(OCH$_2$CH$_3$)$_3$ groups. 15 g carbon black was placed in a 300° F. oven for five days. 35 g of the silane-terminated polythioether was then mixed with the carbon black until the carbon black was substantially wet. 2.0 g HB-40 and 0.5 g Metacure T-12 were then combined with the silane-terminated polythioether/carbon black mixture until all ingredients were thoroughly mixed. The composition was then packaged in a moisture sealed container.

Example 5

Sealant Composition

A silane-terminated polythioether compound was manufactured as in Example 2, i.e., the silane groups on the silane-terminated polythioether were —Si(OCH$_3$)$_3$ groups. 15 g carbon black was placed in a 300° F. oven for five days. 35 g of the silane-terminated polythioether was then mixed with the carbon black until the carbon black was substantially wet. 2.0 g HB-40 and 0.5 g Metacure T-12 were then combined with the silane-terminated polythioether/carbon black mixture until all ingredients were thoroughly mixed. The composition was then packaged in a moisture sealed container.

The compositions of Examples 4 and 5 were allowed to stand in moisture sealed containers for approximately one month at ambient conditions. After one month of storage, the containers were opened and allowed to stand at ambient conditions, allowing the compositions to cure. Hardness measurements were taken periodically using a Rex durometer. Volume swell percentage and percent weight loss of a cured sample were measured according to SAE AS5127/1 section 7.4. The results are shown in Tables 1-4, which report cure time, percent weight loss, and volume swell of each sample. In particular, Table 1 reports the hardness data for samples of the sealant composition prepared according to Example 4, Table 2 reports the hardness data for samples of the sealant composition prepared according to Example 5, Table 3 reports the volume swell and percent weight loss of samples of the sealant composition prepared according to Example 4, and Table 4 reports the volume swell and percent weight loss of samples of the sealant composition prepared according to Example 5.

TABLE 1

| Hardness | |
|---|---|
| Time | Example 4 |
| 31 hours | Tack Free |
| 48 hours | 2A |
| 3 days | 3A |
| 4 days | 10A |
| 7 days | 25A |
| 9 days | 32A |
| 11 days | 37A |
| 13 days | 45A |
| 17 days | 51A |
| 72 days | 77A |

TABLE 2

| Hardness | |
|---|---|
| Time | Example 5 |
| 23 hours | Tack Free |
| 48 hours | 6A |
| 3 days | 18A |
| 4 days | 35A |
| 7 days | 50A |
| 9 days | 60A |
| 11 days | 63A |
| 13 days | 65A |
| 17 days | 68A |
| 72 days | 78A |

TABLE 3

| Volume Swell and Percent Weight Loss of Example 4 | | |
|---|---|---|
| Sample Number | Average Volume Swell | Average Percent Weight Loss |
| 1 | 9.18% | 4.53% |
| 2 | 8.26% | 4.44% |
| 3 | 8.94% | 3.99% |
| 4 | 8.54% | 4.49% |
| Average | 8.73% | 4.36% |

TABLE 4

Volume Swell and Percent Weight Loss of Example 5

| Sample Number | Average Volume Swell | Average Percent Weight Loss |
|---|---|---|
| 1 | 10.93% | 4.06% |
| 2 | 10.72% | 4.31% |
| 3 | 10.95% | 4.31% |
| 4 | 10.65% | 4.32% |
| Average | 10.81% | 4.25% |

The results shown in Tables 1-4 demonstrate that the sealant compositions prepared according to Examples 4 and 5 do not cure to a meaningful degree as long as the compositions are isolated from moisture. Surprisingly, the compositions remain uncured when free of moisture, even at ambient conditions, eliminating the need to store and transport the compositions at −40° F. or −80° F. The results also demonstrate that when sealed against moisture, the compositions have an unexpectedly long shelf life. In addition, the volume swell and weight loss results show that the sealant compositions are suitable for use as fuel tank sealants.

The present invention has been described with reference to exemplary embodiments and aspects, but is not limited thereto. A person skilled in the art will appreciate that other modifications and applications can be made without meaningfully departing from the spirit and scope of the invention. For example, although the compositions are described as useful as fuel tank sealants, they may be useful in other applications as well. In addition, although certain exemplary polythioether components and compounds having silane groups are listed as suitable for the particular reactions, other suitable polythioethers and compounds having silane groups may be used. Accordingly, the foregoing description should not be read as limited to the precise embodiments and aspects described, but should be read consistent with and as support for the following claims, which are to have their fullest and fairest scope.

Throughout the text, use of the word "about" in relation to a range of values modifies both the high and low values recited, and reflects the penumbra of variation associated with measurement, significant figures, and interchangeability, all as understood by a person having ordinary skill in the art to which this invention pertains.

What is claimed:

1. A composition for forming a sealant, the composition comprising:
   a silane-terminated polythioether component represented by $(Y_aA_b)SiR_4Z'—R'—Z'R_4Si(Y_aA_b)$ wherein:
   R' is a polythioether chain having at least one —C—S—C— linkage in its backbone and wherein the backbone is free of S—S linkages and essentially free of ester linkages,
   Y is a hydrolyzable and condensable functional group,
   A is selected from the group consisting of C1 to C4 hydrocarbon functional groups,
   Z' is

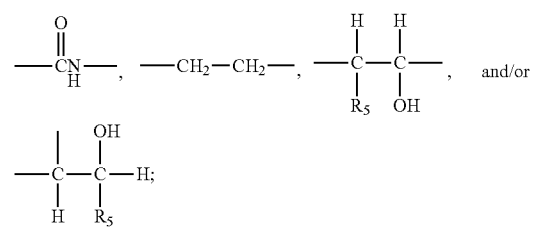

$R_4$ is a $C_1$ to $C_3$ hydrocarbon chain; $R_5$ is hydrogen or a hydrocarbon chain; and
a and b are each an integer ranging from 0 to 3, and the sum of a and b is 3;
a catalyst; and
a filler.

2. The composition of claim 1, wherein the silane-terminated polythioether component comprises a reaction product of a compound having a silane group and a mercapto-terminated polythioether.

3. The composition of claim 2, wherein the compound having a silane group is selected from the group consisting of silane-terminated vinyl compounds, silane-terminated isocyanate compounds, and silane-terminated epoxy compounds.

4. The composition of claim 1, wherein the catalyst comprises a tin catalyst.

5. The composition of claim 1, wherein the composition is substantially free of any polyolefin, polyacrylate, metal oxide, and polyepoxide curing agent.

6. A sealant formed from the composition of claim 1.

7. An aerospace vehicle comprising an aperture at least partially sealed with the sealant of claim 6.

8. A composition comprising a compound represented by Formula 2:

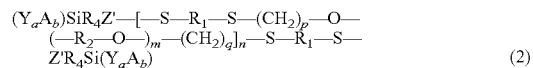

wherein:
$R_1$ is selected from the group consisting of $C_2$ to $C_{10}$ n-alkylene groups, $C_2$ to $C_6$ branched alkylene groups, $C_6$ to $C_8$ cycloalkylene groups, $C_6$ to $C_{10}$ alkylcyloalkylene groups, heterocyclic groups, $—[(—CH_2)_p—X]_q—(CH_2)_r—$ groups, and $—[(—CH_2)_p—X]_q—(—CH_2)_r—$ groups in which at least one $—CH_2—$ unit is substituted with a methyl group;

$R_2$ is selected from the group consisting of $C_2$ to $C_{10}$ n-alkylene groups, $C_2$ to $C_6$ branched alkylene groups, $C_6$ to $C_8$ cycloalkylene groups, $C_6$ to $C_{14}$ alkylcyloalkylene groups, heterocyclic groups, and $—[(—CH_2)_p—X]_q—(CH_2)_r—$ groups;

Y is a hydrolyzable and condensable functional group;

A is selected from the group consisting of C1 to C4 hydrocarbon functional groups;

X is selected from the group consisting of O atoms, S atoms, and $—NR_3—$ groups, wherein $R_3$ is selected from the group consisting of H atoms and methyl groups;

Z' is a functional group resulting from a reaction between mercaptan and a functional group selected from the group consisting of isocyanate groups, epoxy groups and vinyl groups;

$R_4$ is a C1 to C3 hydrocarbon chain;
m is an integer ranging from 1 to 50;
n is an integer ranging from 1 to 60;
p is an integer ranging from 2 to 6;
q is an integer ranging from 1 to 5;
r is an integer ranging from 2 to 10; and
a and b are each an integer ranging from 0 to 3, and the sum of a and b is 3;
a catalyst; and
a filler.

9. The composition of claim 8, wherein the compound represented by Formula 2 is

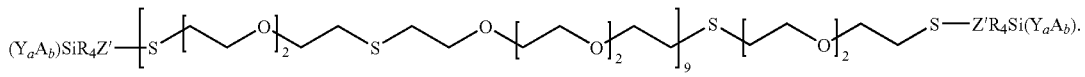

10. The composition of claim 8, wherein m is 1, $R_2$ is n-butylene, and $R_1$ is not ethylene or n-propylene.

11. The composition of claim 8, wherein m is 1, p is 2, q is 2, r is 2, $R_2$ is ethylene, and X is not an O atom.

12. The composition of claim 8, wherein Y is an alkoxy group.

13. The composition of claim 12, wherein Y is a methoxy or ethoxy group.

14. A method of preparing a sealant, the method comprising:

reacting a mercapto-terminated polythioether with a compound having a silane group to form a silane-terminated polythioether represented by $(Y_aA_b)SiR_4Z'$—R'—$Z'R_4Si(Y_aA_b)$ wherein:

R' is a polythioether chain having at least one —C—S—C— linkage in its backbone and wherein the backbone is free of S—S linkages and ester linkages, Y is a hydrolyzable and condensable functional group, A is selected from the group consisting of C1 to C4 hydrocarbon functional groups, Z' is

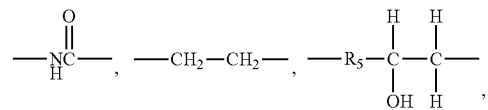

and/or

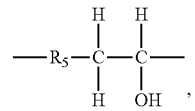

$R_4$ is a $C_1$ to $C_3$ hydrocarbon chain, $R_5$ is hydrogen or a hydrocarbon chain, and a and b are each an integer ranging from 0 to 3, and the sum of a and b is 3;

combining the silane-terminated polythioether with a catalyst to form a composition; and isolating the composition from moisture, wherein the composition remains uncured at ambient temperature when isolated from moisture.

\* \* \* \* \*